(12) United States Patent
Hijikata et al.

(10) Patent No.: US 10,752,055 B2
(45) Date of Patent: Aug. 25, 2020

(54) RUBBER COMPOSITION FOR TIRE

(71) Applicant: The Yokohama Rubber Co., LTD., Minato-ku, Tokyo (JP)

(72) Inventors: Kensuke Hijikata, Hiratsuka (JP); Ayako Kamahori, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 90 days.

(21) Appl. No.: 15/575,311

(22) PCT Filed: May 12, 2016

(86) PCT No.: PCT/JP2016/064188
§ 371 (c)(1),
(2) Date: Nov. 17, 2017

(87) PCT Pub. No.: WO2016/186006
PCT Pub. Date: Nov. 24, 2016

(65) Prior Publication Data
US 2018/0154692 A1    Jun. 7, 2018

(30) Foreign Application Priority Data

May 18, 2015   (JP) ................................. 2015-100753
Jul. 29, 2015   (JP) ................................. 2015-149447

(51) Int. Cl.
| | |
|---|---|
| *B60C 1/00* | (2006.01) |
| *C08K 3/04* | (2006.01) |
| *C08L 7/00* | (2006.01) |
| *C08L 9/00* | (2006.01) |
| *B60C 11/00* | (2006.01) |
| *C08L 9/06* | (2006.01) |

(52) U.S. Cl.
CPC .............. *B60C 1/0016* (2013.01); *B60C 1/00* (2013.01); *B60C 11/005* (2013.01); *C08K 3/04* (2013.01); *C08L 7/00* (2013.01); *C08L 9/00* (2013.01); *C08L 9/06* (2013.01); *B60C 2011/0016* (2013.01); *B60C 2200/04* (2013.01); *B60C 2200/065* (2013.01); *C08K 2201/006* (2013.01)

(58) Field of Classification Search
CPC ....................................................... C08K 3/04
See application file for complete search history.

(56) References Cited

U.S. PATENT DOCUMENTS

| | | | | | |
|---|---|---|---|---|---|
| 8,183,327 | B2 * | 5/2012 | Hochi | ........................ | C08L 7/00 152/564 |
| 9,446,631 | B2 * | 9/2016 | Kameda | .................... | B60C 1/00 |
| 2004/0092647 | A1 | 5/2004 | Chauvin | | |
| 2011/0265923 | A1 | 11/2011 | Arnold et al. | | |
| 2015/0336423 | A1 | 11/2015 | Hata et al. | | |

FOREIGN PATENT DOCUMENTS

| | | | |
|---|---|---|---|
| JP | 02024335 | A * | 1/1990 |
| JP | H02-024335 | | 1/1990 |
| JP | 2004-519552 | | 7/2004 |
| WO | WO 02/092680 | | 11/2002 |
| WO | WO 2010/077232 | | 7/2010 |
| WO | WO 2014/103876 | | 7/2014 |

OTHER PUBLICATIONS

Machine translation of JP 02-024335 A, published Jan. 26, 1990. (Year: 1990).*
Machine translation JP 02-024335 A, published Jan. 26, 1990.*
International Search Report for International Application No. PCT/JP2016/064188 dated Jun. 28, 2016, 2 Pages, Japan.

* cited by examiner

*Primary Examiner* — Vickey Nerangis
(74) *Attorney, Agent, or Firm* — Thorpe North & Western (57) ABSTRACT

Provided is a rubber composition for tires containing, per 100 parts by mass of diene rubber, from 5 to 120 parts by mass of carbon black having a nitrogen adsorption specific surface area $N_2SA$ of 90 m²/g or less and a compressed DBP absorption (24M4) of 95 to 120 mL/100 g, a ratio $\Delta Dst/Dst$ of a half width $\Delta Dst$ (nm) of a mode diameter Dst to the mode diameter Dst (nm) in a Stokes diameter mass distribution curve of aggregates of the carbon black being 0.65 or greater, and the $N_2SA$, (24M4), and Dst satisfying the following formula: $(24M4)/Dst < 0.0093 \times N_2SA - 0.06$.

12 Claims, 5 Drawing Sheets

RUBBER COMPOSITION FOR TIRE

TECHNICAL FIELD

The present technology relates to a rubber composition for tires that maintains or enhances mechanical properties while heat build-up is reduced by blending a carbon black having specific colloidal characteristics.

BACKGROUND ART

The performance required for pneumatic tires includes lower rolling resistance and higher wear resistance as well as superior steering stability. To reduce rolling resistance of a formed tire, heat build-up of a rubber composition constituting a pneumatic tire has been suppressed. As an indicator of the heat build-up in a rubber composition, tan δ at 60° C. determined by dynamic visco-elasticity measurement is typically used, and smaller tan δ (60° C.) of the rubber composition indicates smaller heat build-up.

Examples of methods of reducing the tan δ (60° C.) of a rubber composition include reducing the compounded amount of carbon black, increasing the particle size of carbon black, and blending silica in place of carbon black. However, such methods are problematic in that the mechanical properties such as tensile strength at break, tensile elongation at break, and rubber hardness are diminished and that the steering stability, wear resistance, and durability of a formed tire are diminished.

Furthermore, recently, enhancement in performance of carbon black as well as silica has been desired to improve the wear resistance while the rolling resistance is further reduced.

For example, Japanese Unexamined Patent Application Publication No. 2004-519552 proposes reducing heat build-up in a rubber composition mainly by blending carbon black having an adjusted specific surface area (BET (Brunauer-Emmett-Teller) specific surface area, CTAB (cetyltrimethylammonium bromide) specific surface area, and iodine adsorption index IA), DBP (dibutyl phthalate) structure value, Stokes diameter dst, and the like. However, this rubber composition does not necessarily have an effect sufficient to ensure mechanical strength and wear resistance, and thus there has been a demand for further improvements.

On the other hand, construction vehicles, such as large dump trucks that operate at quarries and/or large scale construction sites, operate for a long time while carrying a heavy load. Large heavy duty tires mounted on such construction vehicles are required not only to have excellent cut resistance but also to prevent tire failure by suppressing overheating of the tire which is achieved by suppressing heat build-up (heat build-up resistance). Cut resistance is a property that makes it difficult to damage a tire when the tire is brought into contact or collision with a barrier or external object. Heat build-up is a property that mitigates the impact by converting the energy applied to a tire due to such a physical impact into heat for heating up a rubber. Because of this, in order to make the cut resistance of the tire excellent, large heat build-up of the rubber is required. On the other hand, in order to avoid overheating of the tire and failure due to the overheating, heat build-up of the rubber is required to be low. Thus, the cut resistance and low heat build-up are in a trade-off relationship.

The method of reducing the heat build-up of a rubber composition may include, for example, reducing the compounded amount of carbon black and increasing the particle size of carbon black. Such methods are problematic, however, in that the mechanical characteristics such as tensile strength at break and the rubber hardness are diminished and that the cut resistance and/or wear resistance of a formed tire is diminished.

International Patent Application Publication No. WO 2010/077232 proposes to blend silica, carbon black, a silane coupling agent, sulfur, and a sulfenamide accelerator at specific proportions with natural rubber in order to reduce the heat build-up of tires for large vehicles. However, this rubber composition does not necessarily have an effect sufficient to improve cut resistance. Therefore, further enhancement in both heat build-up resistance and cut resistance has been demanded.

SUMMARY

The present technology provides a rubber composition for tires that maintains or enhances mechanical properties and cut resistance while heat build-up is reduced by blending a carbon black having specific colloidal characteristics.

In the rubber composition for tires of the first embodiment of the present technology that achieves the object described above, the rubber composition contains: per 100 parts by mass of diene rubber, from 5 to 120 parts by mass of carbon black having a nitrogen adsorption specific surface area $N_2SA$ of 90 $m^2/g$ or less and a compressed DBP absorption (24M4) of 95 to 120 mL/100 g, a ratio $\Delta Dst/Dst$ of a half width $\Delta Dst$ (nm) of a mode diameter Dst to the mode diameter Dst (nm) in a Stokes diameter mass distribution curve of aggregates of the carbon black being 0.65 or greater, and the $N_2SA$, the (24M4), and the Dst satisfying Formula (1) below.

$$(24M4)/Dst < 0.0093 \times N_2SA - 0.06 \quad (1)$$

where Dst is a mode diameter (nm) in Stokes diameter mass distribution curve of aggregates, $N_2SA$ is a nitrogen adsorption specific surface area ($m^2/g$), and (24M4) is a compressed DBP absorption (mL/100 g).

In the rubber composition for tires for construction vehicles of the second embodiment of the present technology, the rubber composition contains: per 100 parts by mass of diene rubber containing 60 mass % or greater of natural rubber, from 30 to 80 parts by mass of inorganic filler containing carbon black having a nitrogen adsorption specific surface area $N_2SA$ of 90 $m^2/g$ or less and a compressed DBP absorption (24M4) of 95 to 120 mL/100 g, a ratio $\Delta Dst/Dst$ of a half width $\Delta Dst$ (nm) of a mode diameter Dst to the mode diameter Dst (nm) in a Stokes diameter mass distribution curve of aggregates of the carbon black being 0.65 or greater, and the $N_2SA$, the (24M4), and the Dst satisfying Formula (1) below.

$$(24M4)/Dst < 0.0093 \times N_2SA - 0.06 \quad (1)$$

where Dst is a mode diameter (nm) in Stokes diameter mass distribution curve of aggregates, $N_2SA$ is a nitrogen adsorption specific surface area ($m^2/g$), and (24M4) is a compressed DBP absorption (mL/100 g).

The rubber composition for tires of the first embodiment of the present technology comprises, per 100 parts by mass of the diene rubber, 5 to 120 parts by mass of carbon black having a nitrogen adsorption specific surface area $N_2SA$ of 90 $m^2/g$ or less, a compressed DBP absorption (24M4) of 95 to 120 mL/100 g, and a ratio $\Delta Dst/Dst$ in the Stokes diameter mass distribution curve of carbon black aggregates of 0.65 or greater, and satisfying the relationship of Formula (1) above, thereby maintaining or enhancing mechanical properties such as tensile strength at break, tensile elongation at break, and rubber hardness while reducing tan δ (60° C.) of the rubber composition.

Dst of the carbon black is preferably 160 nm or greater. Furthermore, $N_2SA$ of the carbon black is preferably 50 $m^2/g$ or greater.

The pneumatic tire in which the rubber composition for tires of the first embodiment of the present technology is used can maintain or enhance steering stability, wear resistance, and durability comparable to or beyond conventional levels while rolling resistance is reduced and fuel economy performance is enhanced.

The rubber composition for tires for construction vehicles of the second embodiment of the present technology comprises 30 to 80 parts by mass of inorganic filler containing the carbon black having a nitrogen adsorption specific surface area $N_2SA$ of 90 $m^2/g$ or less, a compressed DBP absorption (24M4) of 95 to 120 mL/100 g, and a ratio ΔDst/Dst in the Stokes diameter mass distribution curve of carbon black aggregates of 0.65 or greater, and satisfying the relationship of Formula (1) above per 100 parts by mass of the diene rubber containing 60 mass % or greater of natural rubber, thereby maintaining or enhancing cut resistance while reducing heat build-up of the rubber composition.

In the second embodiment of the present technology, Dst of the carbon black is preferably 160 nm or greater. Furthermore, $N_2SA$ of the carbon black is preferably 50 $m^2/g$ or greater.

In the second embodiment of the present technology, 5 to 25 parts by mass of silica is preferably contained as the inorganic filler, and greater than 30 parts by mass of the carbon black is preferably contained.

The pneumatic tire for construction vehicles in which the rubber composition for tires for construction vehicles of the second embodiment of the present technology is used in a tread portion can enhance cut resistance comparable to or beyond conventional levels while heat build-up is reduced, thereby suppressing overheating during continued traveling.

DETAILED DESCRIPTION

Since the rubber composition for tires of the first embodiment of the present technology and the rubber composition for tires for construction vehicles of the second embodiment of the present technology contain a novel carbon black with a particular nitrogen adsorption specific surface area $N_2SA$ and a compressed DBP absorption (24M4) and a specific ratio ΔDst/Dst of a half width ΔDst of a mode diameter Dst to the mode diameter Dst in the Stokes diameter mass distribution curve of aggregates, and a specific relationship between the Dst/(24M4) and the $N_2SA$, mechanical properties, such as tensile strength at break, tensile elongation at break, rubber hardness, wear resistance, and cut resistance, are not deteriorated while tan δ (60° C.) of the rubber composition is reduced using a carbon black having a large particle size.

The carbon black used in the present technology has a nitrogen adsorption specific surface area $N_2SA$ of 90 $m^2/g$ or less. When the $N_2SA$ exceeds 90 $m^2/g$, tan δ (60° C.) becomes large. The $N_2SA$ is preferably 87 $m^2/g$ or less, more preferably 86 $m^2/g$ or less, and further preferably 85 $m^2/g$ or less. The $N_2SA$ is preferably 50 $m^2/g$ or greater, more preferably 53 $m^2/g$ or greater, and further preferably 55 $m^2/g$ or greater. The $N_2SA$ is preferably from 50 to 90 $m^2/g$, and more preferably from 55 to 85 $m^2/g$. In the present specification, $N_2SA$ of carbon black is measured in accordance with JIS (Japanese Industrial Standard) K6217-7.

Furthermore, the compressed DBP absorption (24M4) of the carbon black is from 95 to 120 mL/100 g, and preferably from 100 to 115 mL/100 g. When the compressed DBP absorption is less than 95 mL/100 g, tan δ (60° C.) is increased and wear resistance is reduced. In addition, the molding processability of the rubber composition decreases, and the dispersibility of the carbon black diminishes, so the reinforcing performance of the carbon black cannot be sufficiently achieved. When the compressed DBP absorption is greater than 120 mL/100 g, tensile strength at break, tensile elongation at break, and cut resistance are deteriorated. Furthermore, processability is deteriorated due to the increase in viscosity. The compressed DBP absorption is measured using a compressed sample in accordance with Appendix A of JIS K6217-4.

The carbon black used in the present technology has the nitrogen adsorption specific surface area $N_2SA$ and the compressed DBP absorption (24M4) describe above and has the following relationship regarding a mode diameter Dst in a Stokes diameter mass distribution curve of aggregates and a half width thereof ΔDst.

In the present technology, the ratio ΔDst/Dst of the half width ΔDst (nm) of the Stokes diameter mass distribution curve of aggregates of the carbon black to the mode diameter Dst (nm) in the mass distribution curve is 0.65 or greater, and preferably 0.70 or greater. By setting the ratio ΔDst/Dst to 0.65 or greater, heat build-up can be made smaller. In the present specification, the mode diameter Dst in the Stokes diameter mass distribution curve of aggregates refers to the most frequent mode diameter in the Stokes diameter mass distribution curve of aggregates obtained by optical measurement while subjecting the carbon black to centrifugal sedimentation. Furthermore, the half width ΔDst refers to the width of the distribution at which the frequency is half the height of the maximum point in the mass distribution curve of aggregates. In the present technology, Dst and ΔDst are measured in accordance with the determination of aggregate size distribution by disc centrifuge photosedimentometry of JIS K6217-6.

In the rubber composition for tires of the present technology, the nitrogen adsorption specific surface area $N_2SA$, the compressed DBP absorption (24M4), and the Dst satisfy Formula (1) below.

$$(24M4)/Dst < 0.0093 \times N_2SA - 0.06 \qquad (1)$$

where Dst is a mode diameter (nm) in Stokes diameter mass distribution curve of aggregates, $N_2SA$ is a nitrogen adsorption specific surface area ($m^2/g$), and (24M4) is a compressed DBP absorption (mL/100 g).

Since the carbon black has the $N_2SA$, the compressed DBP absorption, and the ratio $\Delta Dst/Dst$ that are within the particular ranges and the (24M4)/Dst and the $N_2SA$ satisfy Formula (1) above, mechanical properties, such as tensile strength at break, tensile elongation at break, rubber hardness, wear resistance, and cut resistance, can be maintained or enhanced while tan δ (60° C.) of the rubber composition is reduced. The intercept of the right side of Formula (1) above is preferably −0.10, and more preferably −0.12.

Figure 1:
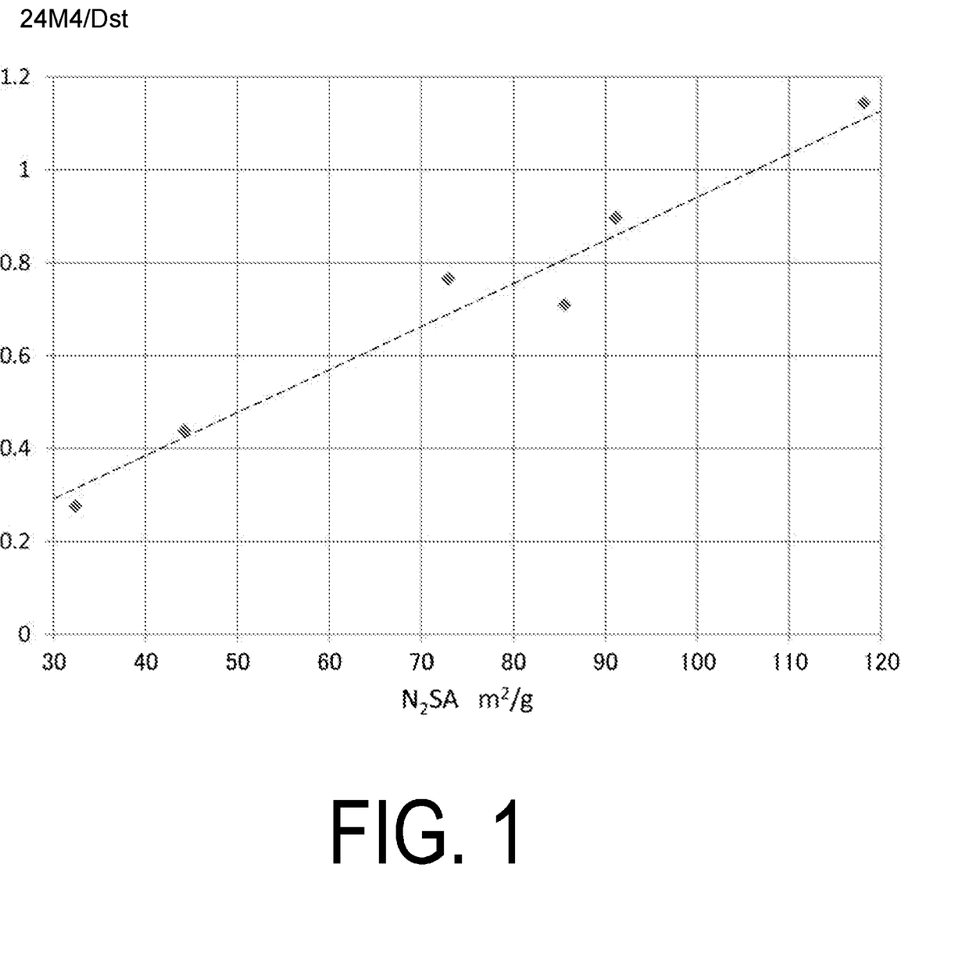
FIG. 1 is a graph showing the relationship between $N_2SA$ and (24M4)/Dst for ASTM grade carbon blacks.

FIG. 1 is a graph showing the relationship between (24M4)/Dst and $N_2SA$ for ASTM grade carbon blacks which are representative carbon blacks having the ASTM Standard Number. In FIG. 1, the horizontal axis represents $N_2SA$ ($m^2/g$) and the vertical axis represents (24M4)/Dst (mL/100 g/nm). As shown in FIG. 1, (24M4)/Dst relative to $N_2SA$ of the conventional standardized carbon blacks is represented as a substantially linear line (dashed line in FIG. 1), the slope thereof is approximately 0.0093, and the intercept is 0.0133.

Figure 2:
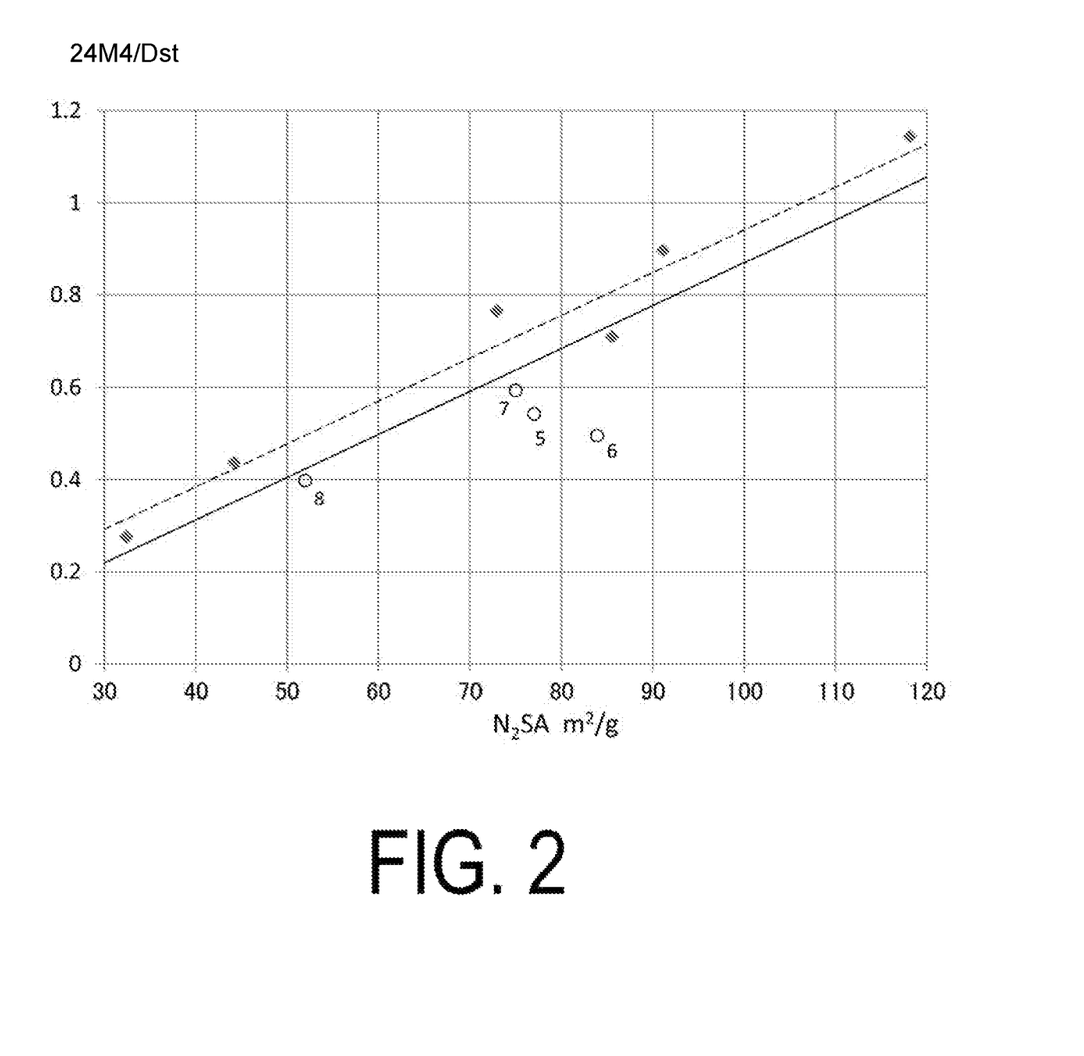
FIG. 2 is an example of graph showing the relationship between $N_2SA$ and (24M4)/Dst for carbon blacks used in the rubber composition for tires of the present technology.

On the other hand, in the carbon black used in the present technology, the upper limit of the ratio of the aggregate properties (24M4)/Dst relative to $N_2SA$ is limited by Formula (1) above. This boundary (a linear line obtained by replacing the sign of inequality in Formula (1) above with the sign of equality) is shown as a solid line in FIG. 2. Furthermore, carbon blacks used in the examples of the specification of the present application are plotted using "○". Note that the dashed line of FIG. 2 is the linear line determined from the ASTM grade carbon blacks. Since the ratio of aggregate properties (24M4)/Dst and $N_2SA$ satisfy this relationship, excellent tensile strength at break and tensile elongation at break can be achieved.

In the present technology, when the carbon black specified by Formula (1) above has the $N_2SA$, the compressed DBP absorption (24M4), and the ratio $\Delta Dst/Dst$ within the ranges described above, mechanical properties such as tensile strength at break, tensile elongation at break, rubber hardness, and wear resistance can be maintained or enhanced while tan δ (60° C.) of the rubber composition is reduced. Furthermore, a tire may have excellent cut resistance.

The Dst of the carbon black used in the present technology is not particularly limited but is preferably 160 nm or greater, more preferably 165 nm or greater, and further preferably 170 nm or greater. When the Dst is less than 160 nm, heat build-up tends to be deteriorated.

A carbon black having the properties described above can be produced by adjusting the production conditions such as the raw material oil introduction conditions of the carbon black production furnace, total amount of air supplied, the amount of the fuel oil and the raw material oil introduced, and the reaction time (retention time of combustion gas from the final raw material oil introduction position until the reaction is stopped).

In the present technology, as the carbon black, a carbon black having the properties described above and the other carbon black can be used together on the condition that the proportion of the carbon black having the particular colloidal properties be greater than 50 mass %. By blending together with the other carbon black, the balance between tan δ and mechanical properties of the rubber composition can be adjusted.

Figure 4:
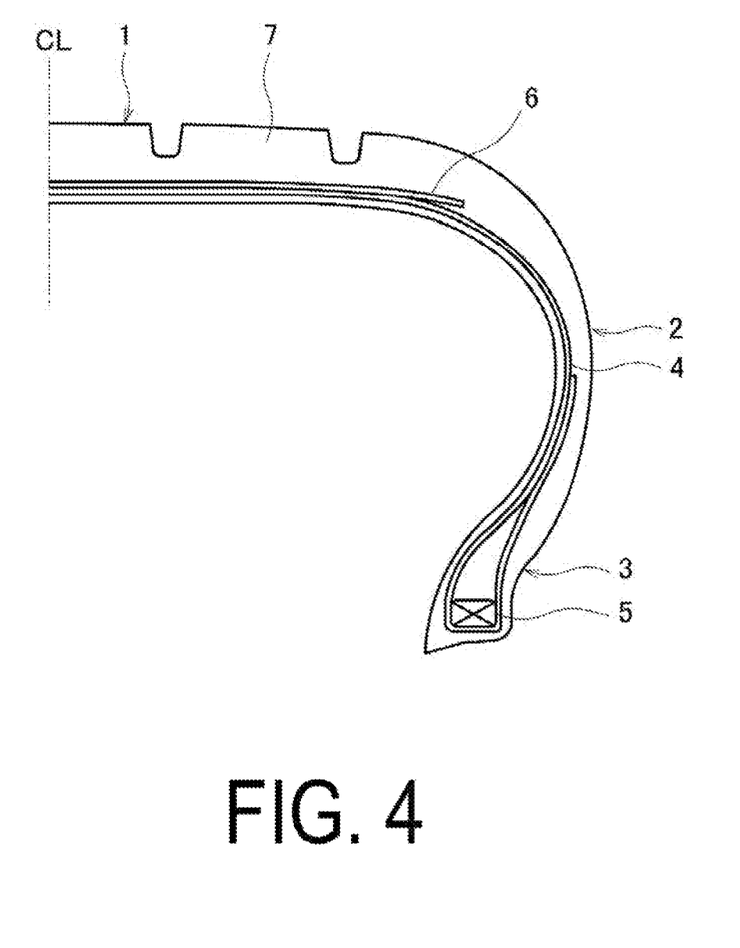
FIG. 4 is a cross-sectional view in a tire meridian direction illustrating an example of an embodiment of a pneumatic tire.

FIG. 4 illustrates an embodiment of the pneumatic tire using the rubber composition for tires of the first embodiment of the present technology. The pneumatic tire comprises a tread portion 1, a sidewall portion 2, and a bead portion 3. A carcass layer 4 is mounted between the left and right bead portions 3 and 3, and each end of the carcass layer 4 is folded over from the inside to the outside of the tire around a bead core 5. A belt layer 6 is disposed on the outer side in the tire radial direction of the carcass layer 4 in the tread portion 1, and a tread rubber 7 is disposed on the outside of this belt layer 6. Note that, although the pneumatic tire illustrated in FIG. 4 is an example of pneumatic tires used in passenger vehicles, light trucks, and the like, the rubber composition for tires of the present technology can also be suitably used in heavy duty pneumatic tires for trucks, buses, and the like, in addition to this embodiment.

The rubber composition for tires of the first embodiment of the present technology can be suitably used in rubbers that constitute cap tread portions, undertread portions, sidewall portions, and bead filler portions of pneumatic tires, cover rubbers for cords such as carcass layers, belt layers, and belt cover layers, side reinforcing rubber layers having a crescent-shaped cross section in run-flat tires, rubbers that constitute rim cushion portions, and the like. The rubber composition for tires of the first embodiment of the present technology can be suitably used in the tread rubber 7 and the sidewall portion 2. In particular, use in the tread rubber 7 is preferred. A pneumatic tire in which the rubber composition of the present technology is used for these members has small heat build-up at the time of traveling, which makes it possible to reduce the rolling resistance and improve the fuel consumption performance. At the same time, due to the enhancement in mechanical properties of the rubber composition, steering stability, wear resistance, and durability can be maintained at or increased to conventional levels or higher.

In the rubber composition for tires of the first embodiment of the present technology, examples of the diene rubber include natural rubber, isoprene rubber, butadiene rubber, styrene-butadiene rubber, and acrylonitrile-butadiene rubber that are typically used in the rubber composition for tires, and the like. Among these, natural rubber, isoprene rubber, butadiene rubber, and styrene-butadiene rubber are preferable. These diene rubbers may be used alone or as a desirable blend thereof.

The compounded amount of the carbon black in the rubber composition for tires is from 5 to 120 parts by mass, and preferably from 20 to 100 parts by mass, per 100 parts by mass of the diene rubber. When the compounded amount of the carbon black is less than 5 parts by mass, tensile strength at break, rubber hardness, and wear resistance of the rubber composition are deteriorated. Furthermore, when the compounded amount of the carbon black is greater than 120 parts by mass, tensile elongation at break decreases while tan δ (60° C.) increases. Furthermore, wear resistance is rather deteriorated. Furthermore, the total amount of the carbon black is from 5 to 120 parts by mass per 100 parts by mass of the diene rubber when the carbon black having the properties described above and the other carbon black are used together. As described above, by blending together with the other carbon black, the balance between tan δ and mechanical properties of the rubber composition can be adjusted.

The rubber composition for a tire can also contain various types of additives that are commonly used in rubber compositions for use in tires, such as vulcanization and crosslinking agents, vulcanization accelerators, various types of inorganic fillers, various types of oils, anti-aging agents, and plasticizers. These additives may be kneaded according to any common method to form a rubber composition and may be used in vulcanization or crosslinking. The compounded amount of these additives may be any conventional amount, as long as the object of the present technology is fulfilled. The rubber composition for a tire according to the present technology can be produced by mixing each of the components described above using a commonly used rubber kneading machine such as a Banbury mixer, a kneader, and a roller.

Figure 5:
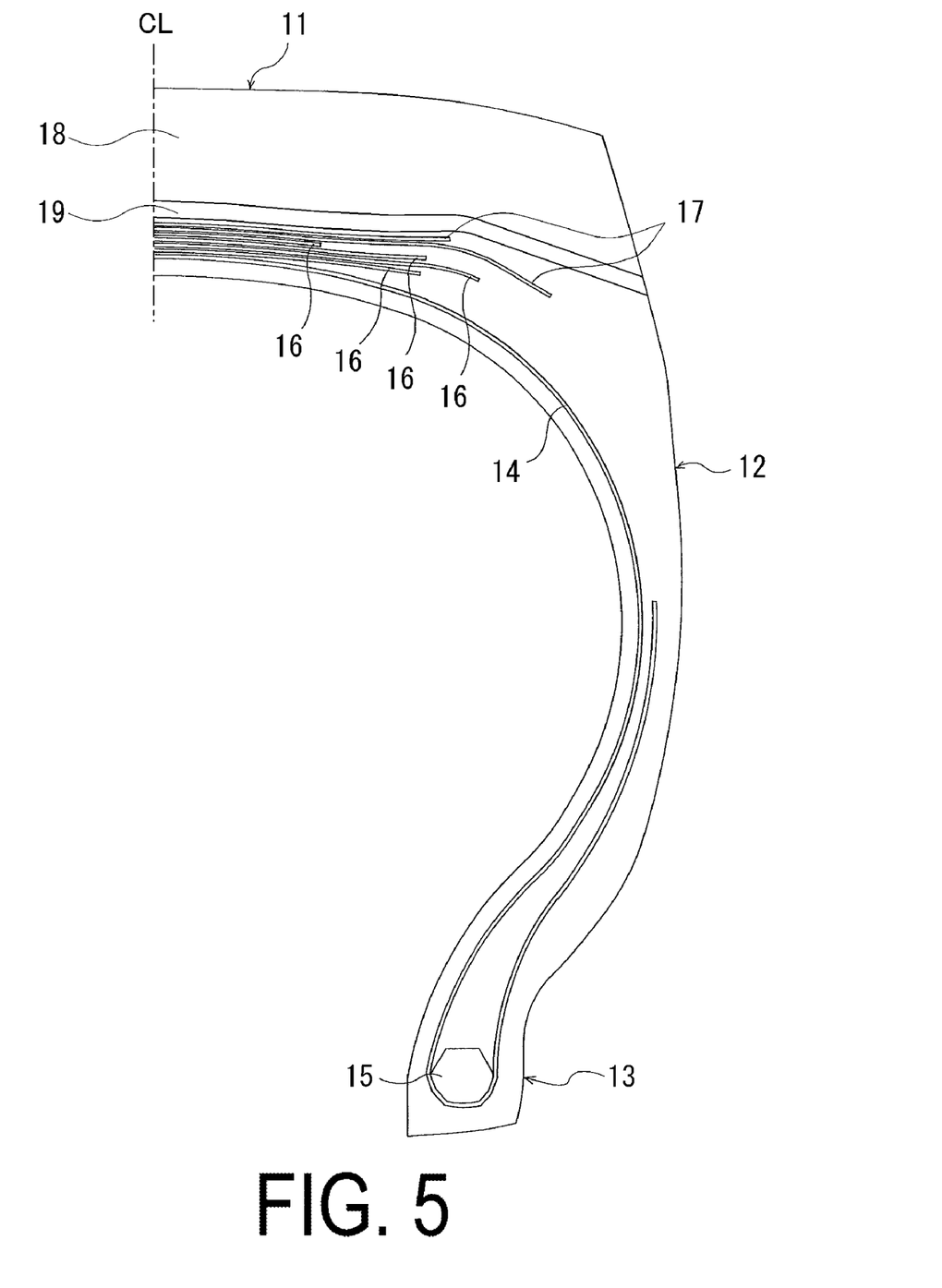
FIG. 5 is a cross-sectional view in a meridian direction illustrating an example of an embodiment of a pneumatic tire for a construction vehicle.

FIG. 5 is an explanatory diagram illustrating an embodiment of the pneumatic tire for construction vehicles that uses the rubber composition for tires for construction vehicles of the second embodiment of the present technology. Note that, in the present specification, the pneumatic tire for construction vehicles is a large-size heavy duty pneumatic tire used for construction vehicles such as large dump trucks, operated in quarries and/or large scale construction sites. Furthermore, a pneumatic tire for a construction vehicle is a large tire mounted on a large vehicle to which a load of 2 tons to 100 tons per one tire is applied.

In FIG. 5, the pneumatic tire for a construction vehicle comprises a tread portion 11, a sidewall portion 12, and a bead portion 13. A carcass layer 14 including a plurality of reinforcing cords extending in a tire radial direction is mounted between a pair of left and right bead portions 13. Ends of the carcass layer 14 are folded around the bead cores 15 from a tire inner side to a tire outer side.

A plurality of belt layers 16 is embedded on the outer circumferential side of the carcass layer 14 in the tread portion 11. The belt layers 16 include a plurality of reinforcing cords that are inclined with respect to the tire circumferential direction, and the direction of the reinforcing cords of the different layers intersect each other. Furthermore, on the outer circumferential side of the belt layers 16, a plurality of layers of belt protecting layers 17 are embedded. While the belt layers 16 reinforce the tread portion 11, the belt protecting layers 17 are disposed to protect the belt layers 16. These belt protecting layers 17 include a plurality of reinforcing cords that are inclined with respect to the tire circumferential direction, and the direction of the reinforcing cords of the different layers intersect each other.

On the outer circumferential side of the belt protecting layers 17 in the tread portion 11, a layer of undertread 19 is arranged. Furthermore, a tread portion is formed by laminating a layer of the cap tread 18 on the outer side of the layer of the undertread 19. The rubber composition for tires for construction vehicles of the second embodiment of the present technology can be suitably used in the rubber constituting cap tread portions, undertread portions, and belt cushion portions for tires for construction vehicles. Particularly preferably, the rubber composition can be suitably used in a tread portion 11 such as a cap tread 18 and an undertread 19 of a pneumatic tire for a construction vehicle. Since a pneumatic tire for a construction vehicle that uses the rubber composition for tires for construction vehicles of the present technology in the tire tread portion 11 reduces heat build-up during traveling, overheating is suppressed and tire durability is enhanced. At the same time, enhancement in cut resistance and rubber hardness of the rubber composition makes it possible to maintain or enhance wear resistance and durability of the pneumatic tire comparable to or beyond conventional levels.

In the rubber composition for tires for construction vehicles of the second embodiment of the present technology, the diene rubber must contain a natural rubber. The content of the natural rubber is 60 mass % or greater, and preferably from 65 to 100 mass %, per 100 mass % of the diene rubber. When the content of the natural rubber is less than 60 mass %, cut resistance cannot be ensured. Furthermore, the effect of reducing heat build-up cannot be sufficiently achieved.

In the rubber composition for tires for construction vehicles of the second embodiment of the present technology, other diene rubber except natural rubber can be blended as the diene rubber. Examples of such other diene rubber include isoprene rubbers, butadiene rubbers, styrene-butadiene rubbers, acrylonitrile-butadiene rubbers, butyl rubbers, halogenated butyl rubbers, and the like. Among these, isoprene rubbers, butadiene rubbers, styrene-butadiene rubbers, and halogenated butyl rubbers are preferable. These diene rubbers may be used alone or as a desirable blend thereof. The content of such other diene rubber is 40 mass % or less, and preferably from 0 to 35 mass %, per 100 mass % of the diene rubber.

In the rubber composition of the second embodiment of the present technology, the inorganic filler containing the carbon black is contained in an amount of 30 to 80 parts by mass, and preferably 38 to 78 parts by mass, per 100 parts by mass of the diene rubber. When the compounded amount of the inorganic filler is less than 30 parts by mass, cut resistance becomes insufficient. Furthermore, when the compounded amount of the inorganic filler is greater than 80 parts by mass, heat build-up becomes excessively large, and overheating may occur during continued traveling.

The compounded amount of the carbon black is preferably greater than 30 parts by mass, and more preferably greater than 30 parts by mass but 75 parts by mass or less, per 100 parts by mass of the diene rubber. When the compounded amount of the carbon black is less than 30 parts by mass, tensile strength at break, rubber hardness, and cut resistance of the rubber composition may be deteriorated. When the compounded amount of the carbon black is greater than 75 parts by mass, heat build-up may become large.

As the carbon black, a carbon black having the properties described above and the other carbon black can be used together on the condition that the proportion of the carbon black having the particular colloidal properties be greater than 50 mass %, and the total amount of the carbon black be preferably greater than 30 parts by mass but 75 parts by mass or less per 100 parts by mass of the diene rubber. As described above, by blending together with the other carbon black, the balance between heat build-up, and cut resistance and rubber hardness of the rubber composition can be adjusted.

In the second embodiment of the present technology, silica, clay, talc, mica, calcium carbonate, and the like may be blended as the inorganic filler in addition to the carbon black. In particular, by blending silica, heat build-up can be made small.

The compounded amount of the silica is from 5 to 25 parts by mass, and preferably from 8 to 23 parts by mass, per 100 parts by mass of the diene rubber. By setting the compounded amount of the silica to the range described above, both low heat build-up and cut resistance of the rubber composition can be achieved. When the compounded amount of the silica is less than 5 parts by mass, heat build-up cannot be sufficiently made small. When the compounded amount of the silica is greater than 25 parts by mass, wear resistance decreases. Note that, in the present technology, silica is an optional component. If the inorganic filler is made only from carbon black or from inorganic filler(s) except silica, the rubber hardness of the rubber composition for tires for construction vehicles can be increased. Such a rubber composition is suitable to form an undertread portion.

The nitrogen adsorption specific surface area of the silica is preferably 150 to 250 $m^2/g$. When the nitrogen adsorption specific surface area of the silica is less than 150 $m^2/g$, the reinforcing property of the rubber composition becomes insufficient, and cut resistance becomes insufficient. Furthermore, when the nitrogen adsorption specific surface area of the silica is greater than 250 m²/g, heat build-up becomes large. Note that the nitrogen adsorption specific surface area of silica is determined in accordance with ISO (International Organization for Standardization) 9277.

The silica used in the present technology may be a silica having the properties described above and may be selected appropriately from commercially available products or produced with an ordinary method so as to have the properties described above. Types of silica that can be used include wet method silica, dry method silica, surface treated silica, and the like.

In the rubber composition of the present technology, a silane coupling agent is preferably compounded together with the silica, and this enables enhancement of the dispersibility of the silica and makes the reinforcing properties of the rubber component even higher. The compounded amount of the silane coupling agent is preferably from 3 to 20 mass %, and more preferably from 5 to 15 mass %, relative to the compounded amount of the silica. When the compounded amount of the silane coupling agent is less than 3 mass % of the mass of the silica, the effect of enhancing dispersibility of the silica cannot be sufficiently achieved. Furthermore, when the compounded amount of the silane coupling agent is greater than 20 mass %, the silane coupling agents condense, and the desired effects cannot be achieved.

The silane coupling agent is not particularly limited, but is preferably a sulfur-containing silane coupling agent. Examples thereof include bis-(3-triethoxysilylpropyl)tetrasulfide, bis(3-triethoxysilylpropyl)disulfide, 3-trimethoxysilylpropyl benzothiazole tetrasulfide, γ-mercaptopropyltriethoxysilane, 3-octanoylthiopropyl triethoxysilane, and the like.

The rubber composition for tires for construction vehicles can also contain various types of additives that are commonly used in rubber compositions for tires, such as vulcanization and crosslinking agents, vulcanization accelerators, various types of inorganic fillers, various types of oils, anti-aging agents, and plasticizers. These additives may be kneaded according to any common method to form a rubber composition and may be used in vulcanization or crosslinking. The compounded amount of these additives may be any conventional amount, as long as the object of the present technology is fulfilled. The rubber composition for tires for construction vehicles of the present technology can be produced by mixing each of the components described above using a commonly used rubber kneading machine such as a Banbury mixer, a kneader, and a roller.

The present technology is further explained below by Examples. However, the scope of the present technology is not limited to these Examples.

EXAMPLES

Examples 1 to 4

Figure 3:
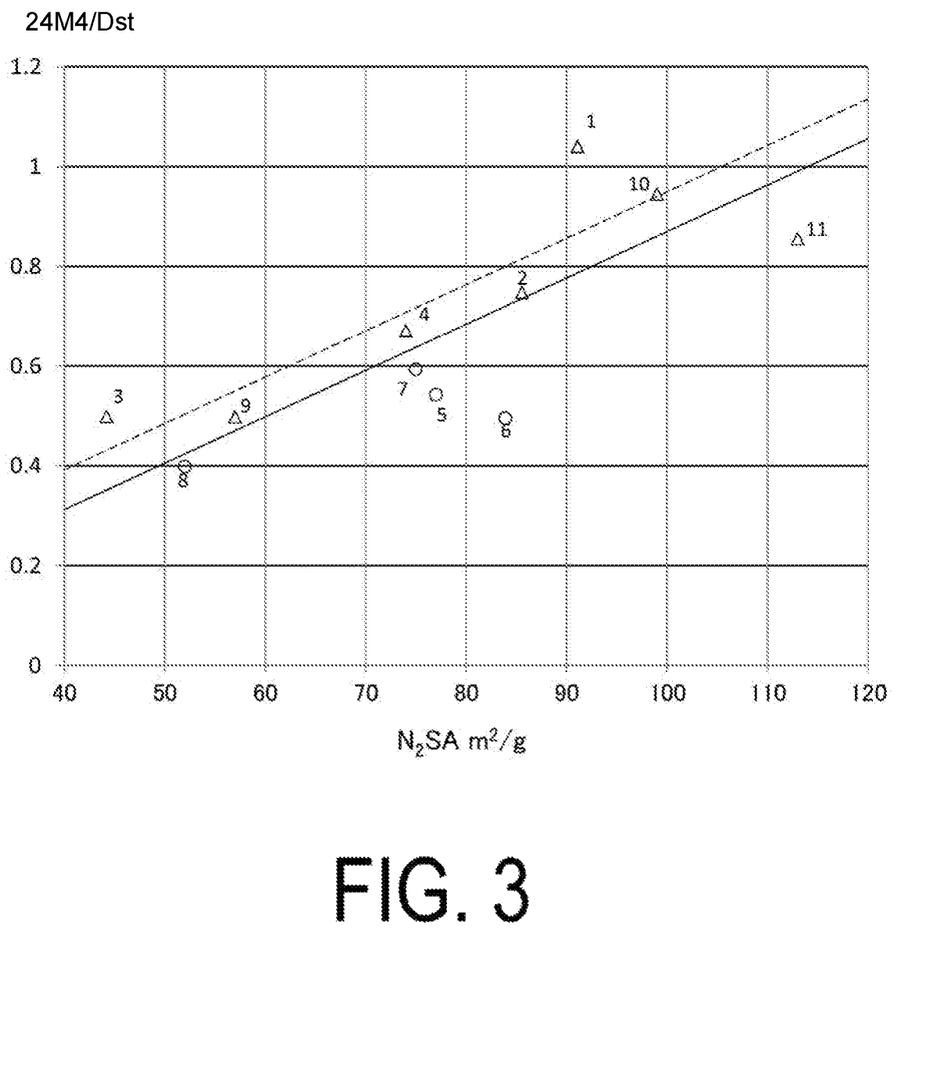
FIG. 3 is a graph showing the relationship between $N_2SA$ and (24M4)/Dst for carbon blacks used in the examples and the comparative examples of the present specification.

Eleven types of rubber compositions (Examples 1 to 4, Standard Example 1, and Comparative Examples 1 to 6) were prepared using 11 types of carbon blacks (CB-1 to CB-11). Among these, three types of carbon blacks (CB-1 to CB-3) were commercial grade products, and eight types of carbon blacks (CB-4 to CB-11) were trial products. The colloidal properties of each of the products are shown in Table 1. Furthermore, FIG. 3 plotted a relationship between (24M4)/Dst and $N_2SA$ of each of the carbon blacks CB-1 to CB-11, and the reference numbers of the respective carbon blacks were written. Note that, in FIG. 3, the solid line is a straight line obtained when the sign of inequality is replaced with the sign of equality, and the dashed line is a linear line of carbon blacks equivalent to ASTM grade carbon blacks.

TABLE 1

| | | Type of carbon black | | | | |
|---|---|---|---|---|---|---|
| | | CB-1 | CB-2 | CB-3 | CB-4 | CB-5 |
| $N_2SA$ | m²/g | 91 | 86 | 44 | 74 | 77 |
| 24M4 | mL/100 g | 102 | 75 | 82 | 100 | 96 |
| Dst | nm | 98 | 100 | 165 | 148 | 177 |
| ΔDst | nm | 61 | 74 | 116 | 125 | 159 |
| ΔDst/Dst | — | 0.62 | 0.74 | 0.70 | 0.84 | 0.90 |
| Left side of Formula (1) 24M4/Dst | — | 1.04 | 0.75 | 0.50 | 0.67 | 0.54 |
| Right side of Formula (1) 0.0093 × N2SA − 0.06 | — | 0.79 | 0.74 | 0.35 | 0.63 | 0.66 |
| Satisfying/unsatisfying Formula (1) | Satisfied/unsatisfied | Unsatisfied | Unsatisfied | Unsatisfied | Unsatisfied | Satisfied |

| | | Type of carbon black | | | | |
|---|---|---|---|---|---|---|
| | | CB-6 | CB-7 | CB-8 | CB-9 | CB-10 | CB-11 |
| $N_2SA$ | m²/g | 84 | 75 | 52 | 57 | 99 | 113 |
| 24M4 | mL/100 g | 105 | 111 | 100 | 94 | 104 | 107 |
| Dst | nm | 212 | 187 | 251 | 189 | 110 | 125 |
| ΔDst | nm | 172 | 136 | 202 | 124 | 92 | 116 |
| ΔDst/Dst | — | 0.81 | 0.73 | 0.80 | 0.66 | 0.84 | 0.93 |
| Left side of Formula (1) 24M4/Dst | — | 0.50 | 0.59 | 0.40 | 0.50 | 0.95 | 0.86 |
| Right side of Formula (1) 0.0093 × N2SA − 0.06 | — | 0.72 | 0.64 | 0.42 | 0.47 | 0.86 | 0.99 |
| Satisfying/unsatisfying Formula (1) | Satisfied/unsatisfied | Satisfied | Satisfied | Satisfied | Unsatisfied | Unsatisfied | Satisfied |

In Table 1, each abbreviation represents each of the following colloidal properties.

N$_2$SA: Nitrogen adsorption specific surface area measured based on JIS K6217-7

24M4: Compressed DBP absorption measured based on JIS K6217-4 (compressed sample)

Dst: mode diameter representing the maximum value of the mass distribution curve of the Stokes diameter of aggregates according to disc centrifuge photosedimentometry measured based on JIS K6217-6

ΔDst: Width (half-width) of distribution when the mass frequency is half the height of the maximum point in the Stokes diameter mass distribution curve of aggregates according to disc centrifuge photosedimentometry measured based on JIS K6217-6

ΔDst/Dst: Value of the ratio ΔDst/Dst

Left side of Formula (1) Calculated value of 24M4/Dst

Right side of Formula (1) Calculated value of 0.0093× N$_2$SA-0.06

Satisfying/unsatisfying Formula (1): "Satisfied" represents the case where "left side<right side" was satisfied, and "Unsatisfied" represents the case where "left side<right side" was not satisfied Furthermore, in Table 1, the carbon blacks CB1 to CB3 represent the following commercial grades.

CB1: Niteron #2001S, manufactured by NSCC Carbon Co., Ltd., N339

CB2: SEAST 300, manufactured by Tokai Carbon Co., Ltd., N326

CB3: Niteron #10N, manufactured by NSCC Carbon Co., Ltd., N550

Production of Carbon Blacks CB4 to CB11

The carbon blacks CB4 to CB11 were produced using a cylindrical reaction furnace while varying the total amount of air supplied, the amount of fuel oil introduced, the amount of raw material oil introduced, and the reaction time as shown in Table 2.

charged to be cooled at room temperature. The master batch was fed to a 55 L kneader, to which the sulfur and the vulcanization accelerator were added, and mixed to obtain a rubber composition for a tire. Note that the amounts of the compounding agents shown in Table 4 are shown in terms of "part by mass" per 100 parts by mass of the SBR shown in Table 3.

The obtained 11 types of rubber compositions were vulcanized in respective molds with a prescribed shape at 160° C. for 20 minutes to produce test pieces. Rubber hardness, tensile characteristics, and tan δ at 60° C. were evaluated according to the methods described below.

Rubber Hardness

The rubber hardness was measured using the obtained test piece in accordance with JIS K6253 using a type A durometer at a temperature of 20° C. The obtained results are shown on the row "Rubber hardness" of Table 3 as index values with the value of Standard Example 1 being expressed as an index of 100. A larger index value indicates smaller rubber hardness and superior steering stability of a formed tire.

Tensile Characteristics

JIS #3 dumbbell test pieces (thickness: 2 mm) were punched from the obtained test pieces in accordance with JIS K6251. The test was conducted at a temperature of 20° C. at a tensile test speed of 500 mm/min, and tensile strength at break and tensile elongation at break were measured. The obtained results are shown on the rows "tensile strength at break" and "tensile elongation at break" of Table 3 as index values, with the corresponding values of Standard Example 1 being expressed as index values of 100. Larger index values indicate larger tensile strength at break and tensile elongation at break, and superior mechanical properties.

tan δ at 60° C.

Using a viscoelastic spectrometer, manufactured by Toyo Seiki Seisaku-sho, Ltd., the loss tangent, tan δ, at a tem-

TABLE 2

| Production conditions | | CB-4 | CB-5 | CB-6 | CB-7 | CB-8 | CB-9 | CB-10 | CB-11 |
|---|---|---|---|---|---|---|---|---|---|
| Total amount of air supplied | Nm³/H | 1300 | 1325 | 1375 | 1325 | 1050 | 1100 | 1450 | 1550 |
| Amount of fuel oil introduced | Nm³/H | 65 | 62 | 55 | 60 | 60 | 70 | 75 | 72 |
| Amount of raw material oil introduced | Nm³/H | 320 | 315 | 295 | 310 | 305 | 315 | 320 | 335 |
| Reaction time | ms | 230 | 245 | 250 | 250 | 260 | 240 | 200 | 205 |

Preparation and Evaluation of Rubber Compositions for Tires

In preparing 11 types of rubber compositions (Examples 1 to 4, Standard Example 1, and Comparative Examples 1 to 6) with the compositions shown in Table 3 to which the same compounding agents shown in Table 4 were added using the 11 types of the carbon blacks (CB-1 to CB-11) described above, the components except sulfur and a vulcanization accelerator were weighed, kneaded for 15 minutes in a 55 L kneader. Subsequently, the resultant master batch was disperature of 60° C. of the obtained test piece was measured in accordance with JIS K6394 under conditions at an initial distortion of 10%, an amplitude of ±2%, and a frequency of 20 Hz. The obtained results of tan δ are shown in the row "tan δ (60° C.)" of Table 3 as index values with the value of Standard Example 1 being expressed as an index of 100. A smaller index value of tan δ (60° C.) indicates smaller heat build-up and smaller rolling resistance of a formed tire, thereby indicating superior fuel economy performance.

TABLE 3

| | | | Standard Example | Comparative Example 1 | Comparative Example 2 | Comparative Example 3 | Example 1 |
|---|---|---|---|---|---|---|---|
| SBR | | CCCPart by mass | 100 | 100 | 100 | 100 | 100 |

TABLE 3-continued

|  |  |  |  |  |  |  |
|---|---|---|---|---|---|---|
| Carbon black | Part by mass | 50 | 50 | 50 | 50 | 50 |
| Type |  | CB-1 | CB-2 | CB-3 | CB-4 | CB-5 |
| $N_2SA$ | $m^2/g$ | 91 | 86 | 44 | 74 | 77 |
| 24M4 | mL/100 g | 102 | 75 | 82 | 100 | 96 |
| ΔDst/Dst | — | 0.62 | 0.74 | 0.70 | 0.84 | 0.90 |
| Dst | nm | 98 | 100 | 165 | 148 | 177 |
| Satisfying/unsatisfying Formula (1) |  | Unsatisfied | Unsatisfied | Unsatisfied | Unsatisfied | Satisfied |
| Hardness (at 20° C.) | Index value | 100 | 93 | 94 | 101 | 101 |
| Tensile strength at break | Index value | 100 | 100 | 88 | 94 | 103 |
| Tensile elongation at break | Index value | 100 | 118 | 98 | 92 | 106 |
| tan δ (60° C.) | Index value | 100 | 94 | 75 | 86 | 79 |

|  |  | Example 2 | Example 3 | Example 4 | Comparative Example 4 | Comparative Example 5 | Comparative Example 6 |
|---|---|---|---|---|---|---|---|
| SBR | Part by mass | 100 | 100 | 100 | 100 | 100 | 100 |
| Carbon black | Part by mass | 50 | 50 | 50 | 50 | 50 | 50 |
| Type |  | CB-6 | CB-7 | CB-8 | CB-9 | CB-10 | CB-11 |
| $N_2SA$ | $m^2/g$ | 84 | 75 | 52 | 57 | 99 | 113 |
| 24M4 | mL/100 g | 105 | 111 | 100 | 94 | 104 | 107 |
| ΔDst/Dst | — | 0.81 | 0.73 | 0.80 | 0.66 | 0.84 | 0.93 |
| Dst | nm | 212 | 187 | 251 | 189 | 110 | 125 |
| Satisfying/unsatisfying Formula (1) |  | Satisfied | Satisfied | Satisfied | Unsatisfied | Unsatisfied | Satisfied |
| Hardness (at 20° C.) | Index value | 100 | 103 | 110 | 99 | 101 | 101 |
| Tensile strength at break | Index value | 104 | 106 | 100 | 97 | 101 | 118 |
| Tensile elongation at break | Index value | 121 | 105 | 100 | 96 | 92 | 120 |
| tan δ (60° C.) | Index value | 80 | 72 | 86 | 75 | 91 | 103 |

The types of raw materials used in Table 3 are described below.
SBR: Styrene-butadiene rubber; Nipol 1502, manufactured by Zeon Corporation
CB1 to CB11: Carbon blacks shown in Table 1 above

TABLE 4

| Common formulation of rubber composition for tire |  |
|---|---|
| Stearic acid | 5.0 parts by mass |
| Zinc oxide | 3.0 parts by mass |
| Oil | 6.0 parts by mass |
| Vulcanization accelerator | 0.8 parts by mass |
| Sulfur | 2.2 parts by mass |

The types of raw materials used in Table 4 are described below.
Stearic acid: beads stearic acid, manufactured by NOF Corporation
Zinc oxide: Zinc Oxide #3, manufactured by Seido Chemical Industry Co., Ltd.
Oil: Extract No. 4S, manufactured by Showa Shell Sekiyu K.K.
Vulcanization accelerator: NOCCELER NS-P, manufactured by Ouchi Shinko Chemical Industrial Co., Ltd.
Sulfur: Oil treatment sulfur, manufactured by Tsurumi Chemical Industry Co., Ltd.

As is clear from Table 3, it was confirmed that the rubber compositions for tires of Examples 1 to 4 maintained or enhanced the rubber hardness, the tensile strength at break, the tensile elongation at break, and tan δ (60° C.) comparable to or beyond conventional levels.

As is clear from Table 3, the rubber composition of Comparative Example 1 exhibited poor rubber hardness since the compressed DBP absorption (24M4) of the carbon black CB-2 was less than 95 mL/100 g, and Formula (1) was not satisfied.

The rubber composition of Comparative Example 2 exhibited poor rubber hardness, poor tensile strength at break, and poor tensile elongation at break since the compressed DBP absorption (24M4) of the carbon black CB-3 was less than 95 mL/100 g, and Formula (1) was not satisfied.

The rubber composition of Comparative Example 3 exhibited poor tensile strength at break and poor tensile elongation at break since the carbon black CB-4 did not satisfy Formula (1).

The rubber composition of Comparative Example 4 exhibited poor tensile strength at break and poor tensile elongation at break since the compressed DBP absorption (24M4) of the carbon black CB-9 was less than 95 mL/100 g, and Formula (1) was not satisfied.

The rubber composition of Comparative Example 5 exhibited poor tensile elongation at break since the nitrogen adsorption specific surface area $N_2SA$ of the carbon black CB-10 was greater than 90 $m^2/g$, and Formula (1) was not satisfied.

Since the rubber composition of Comparative Example 6 had the nitrogen adsorption specific surface area $N_2SA$ of the carbon black CB-11 of greater than 90 $m^2/g$, tan δ (60° C.) became large.

Examples 5 to 12

Twenty-three types of rubber compositions (Examples 5 to 12, Standard Examples 2 and 3, and Comparative Examples 7 to 19) were prepared using 11 types of carbon blacks (CB-1 to CB-11). Among these, three types of carbon blacks (CB-1 to CB-3) were commercial grade products, and eight types of carbon blacks (CB-4 to CB-11) were trial products. The colloidal properties of each of the products are shown in Table 1. The colloidal characteristics, commercial grades, and production methods in Table 1 are as described above, and explanations thereof are omitted.

Preparation and Evaluation of Rubber Compositions for Tires

In preparing 23 types of rubber compositions (Examples 5 to 12, Standard Examples 2 and 3, and Comparative Examples 7 to 19) with the compositions shown in Tables 5, 6, and 7 to which the same compounding agents shown in Table 8 were added using the 11 types of the carbon blacks (CB-1 to CB-11) described above. The components except sulfur and a vulcanization accelerator were weighed and kneaded for 15 minutes in a 55 L kneader. Subsequently, the resultant master batch was discharged to be cooled at room temperature. The master batch was fed to a 55 L kneader, to which the sulfur and the vulcanization accelerator were added, and mixed to obtain a rubber composition for a tire for a construction vehicle. Note that the amounts of the compounding agents shown in Table 8 are shown in terms of "part by mass" per 100 parts by mass of the diene rubber shown in Tables 5 to 7.

Pneumatic tires for construction vehicles having a tire size of 2700R49 was produced by using 15 types of the rubber compositions for tires for construction vehicles (Examples 5 to 9, Standard Example 2, and Comparative Examples 7 to 15), among the obtained rubber compositions described above, in cap treads. Using the 15 types of produced pneumatic tires for construction vehicles, heat build-up and cut resistance were tested by the method described below.

Heat Build-Up

The obtained pneumatic tires for construction vehicles were mounted on a large dump truck, and then inner temperature of the tread (5 mm from overhead cover) after traveling for a fixed length of time was measured and expressed in index values. The obtained results are shown on the rows "heat build-up resistance" in Tables 5 and 6 as index values with the value of Standard Example 2 being expressed as an index value of 100. A smaller index value of the heat build-up resistance indicates capability of suppressing temperature increase in a pneumatic tire for a construction vehicle. Note that the tolerance range of the index value of the heat build-up resistance is 101 or less, and is preferably 98 or less.

Cut Resistance

The obtained pneumatic tires for construction vehicles were mounted on a large dump truck, and degree and numbers of cuts and scratches were visually determined after traveling off road for 1500 hours. The obtained results are shown on the rows "Cut resistance" in Tables 5 and 6 as index values with the value of Standard Example 2 being expressed as an index value of 100. A larger index value of cut resistance indicates superior cut resistance and superior tire durability. Note that the tolerance range of the index value of the cut resistance is 99 or greater, and is preferably 102 or greater.

TABLE 5

| | | Standard Example 2 | Comparative Example 7 | Comparative Example 8 | Comparative Example 9 |
|---|---|---|---|---|---|
| NR | Part by mass | 100 | 100 | 100 | 100 |
| BR | Part by mass | — | — | — | — |
| Silica | Part by mass | 10 | 10 | 10 | 10 |
| Coupling agent | Part by mass | 0.8 | 0.8 | 0.8 | 0.8 |
| Carbon black | Part by mass | 50 | 50 | 50 | 50 |
| Type of carbon black | | CB-2 | CB-1 | CB-3 | CB-4 |
| $N_2SA$ | $m^2/g$ | 86 | 91 | 44 | 74 |
| 24M4 | mL/100 g | 75 | 102 | 82 | 100 |
| ΔDst/Dst | — | 0.74 | 0.62 | 0.70 | 0.84 |
| Dst | nm | 100 | 98 | 165 | 148 |
| Satisfying/unsatisfying Formula (1) | | Unsatisfied | Unsatisfied | Unsatisfied | Unsatisfied |
| Cut resistance | Index value | 100 | 102 | 75 | 93 |
| Heat build-up resistance | Index value | 100 | 110 | 80 | 105 |

| | | Example 5 | Example 6 | Example 7 | Example 8 |
|---|---|---|---|---|---|
| NR | Part by mass | 100 | 100 | 100 | 100 |
| BR | Part by mass | — | — | — | — |
| Silica | Part by mass | 10 | 10 | 10 | 10 |
| Coupling agent | Part by mass | 0.8 | 0.8 | 0.8 | 0.8 |
| Carbon black | Part by mass | 50 | 50 | 50 | 50 |
| Type of carbon black | | CB-5 | CB-6 | CB-7 | CB-8 |
| $N_2SA$ | $m^2/g$ | 77 | 84 | 75 | 52 |
| 24M4 | mL/100 g | 96 | 105 | 111 | 100 |
| ΔDst/Dst | — | 0.90 | 0.81 | 0.73 | 0.80 |
| Dst | nm | 177 | 212 | 187 | 251 |
| Satisfying/unsatisfying Formula (1) | | Satisfied | Satisfied | Satisfied | Satisfied |
| Cut resistance | Index value | 116 | 117 | 115 | 108 |
| Heat build-up resistance | Index value | 90 | 85 | 80 | 78 |

TABLE 6

| | | Comparative Example 10 | Comparative Example 11 | Comparative Example 12 |
|---|---|---|---|---|
| NR | Part by mass | 100 | 100 | 100 |
| BR | Part by mass | — | — | — |
| Silica | Part by mass | 10 | 10 | 10 |
| Coupling agent | Part by mass | 0.8 | 0.8 | 0.8 |
| Carbon black | Part by mass | 50 | 50 | 50 |
| Type of carbon black | | CB-9 | CB-10 | CB-11 |
| $N_2SA$ | $m^2/g$ | 57 | 99 | 113 |
| 24M4 | mL/100 g | 94 | 104 | 107 |
| ΔDst/Dst | — | 0.66 | 0.84 | 0.93 |
| Dst | nm | 189 | 110 | 125 |
| Satisfying/unsatisfying Formula (1) | | Unsatisfied | Unsatisfied | Satisfied |
| Cut resistance | Index value | 95 | 117 | 120 |
| Heat build-up resistance | Index value | 78 | 110 | 112 |

| | | Comparative Example 13 | Comparative Example 14 | Comparative Example 15 | Example 9 |
|---|---|---|---|---|---|
| NR | Part by mass | 50 | 100 | 100 | 100 |
| BR | Part by mass | 50 | — | — | — |
| Silica | Part by mass | 10 | 10 | 10 | 5 |
| Coupling agent | Part by mass | 0.8 | 0.8 | 0.8 | 0.4 |
| Carbon black | Part by mass | 50 | 90 | 10 | 55 |
| Type of carbon black | | CB-7 | CB-7 | CB-7 | CB-7 |
| $N_2SA$ | $m^2/g$ | 75 | 75 | 75 | 75 |
| 24M4 | mL/100 g | 111 | 111 | 111 | 111 |
| ΔDst/Dst | — | 0.73 | 0.73 | 0.73 | 0.73 |

TABLE 6-continued

| Dst | nm | 187 | 187 | 187 | 187 |
|---|---|---|---|---|---|
| Satisfying/unsatisfying Formula (1) | | Satisfied | Satisfied | Satisfied | Satisfied |
| Cut resistance | Index value | 85 | 120 | 70 | 117 |
| Heat build-up resistance | Index value | 98 | 105 | 80 | 83 |

The types of raw materials used in Tables 5 and 6 are described below.

NR: Natural rubber, STR 20
BR: Polybutadiene; Nipol BR1220, manufactured by Zeon Corporation
Silica: Zeosil 1165MP, manufactured by Solvay; nitrogen adsorption specific surface area: 165 m²/g
Coupling agent: Sulfur-containing silane coupling agent; bis(3-triethoxysilylpropyl) tetrasulfide; Si 69, manufactured by Degussa
CB1 to CB11: Carbon blacks shown in Table 1 above As is clear from Tables 5 and 6, it was confirmed that the rubber compositions for tires for construction vehicles of Examples 5 to 9 maintained or enhanced the cut resistance and the heat build-up resistance comparable to or beyond conventional levels.

As is clear from Table 5, the rubber composition of Comparative Example 7 exhibited poor heat build-up resistance since the nitrogen adsorption specific surface area $N_2SA$ of the carbon black CB-1 was greater than 90 m²/g, the compressed DBP absorption (24M4) was less than 95 mL/100 g, and Formula (1) was not satisfied.

The rubber composition of Comparative Example 8 exhibited poor cut resistance since the compressed DBP absorption (24M4) of the carbon black CB-3 was less than 95 mL/100 g, and Formula (1) was not satisfied.

The rubber composition of Comparative Example 9 exhibited poor heat build-up resistance and poor cut resistance since the carbon black CB-4 did not satisfy Formula (1).

As is clear from Table 6, the rubber composition of Comparative Example 10 exhibited poor cut resistance since the compressed DBP absorption (24M4) of the carbon black CB-9 was less than 95 mL/100 g, and Formula (1) was not satisfied.

The rubber composition of Comparative Example 11 exhibited poor heat build-up resistance since the nitrogen adsorption specific surface area $N_2SA$ of the carbon black CB-10 was greater than 90 m²/g, and Formula (1) was not satisfied.

The rubber composition of Comparative Example 12 exhibited poor heat build-up resistance since the nitrogen adsorption specific surface area $N_2SA$ of the carbon black CB-11 was greater than 90 m²/g.

The rubber composition of Comparative Example 13 exhibited poor cut resistance since the content of the natural rubber was less than 60 mass %.

The rubber composition of Comparative Example 14 exhibited poor heat build-up resistance since the compounded amount of the carbon black was greater than 80 parts by mass.

The rubber composition of Comparative Example 15 exhibited poor cut resistance since the compounded amount of the inorganic filler including the carbon black was less than 30 parts by mass.

Among the obtained rubber compositions described above, eight types of rubber compositions for tires of construction vehicles (Examples 10 to 12, Standard Example 3, and Comparative Examples 16 to 19) were vulcanized in a mold having a predetermined shape at 160° C. for 20 minutes to produce a test piece, and the rubber hardness, tan δ at 60° C., and tensile strength at break were evaluated by the methods described below.

Rubber Hardness

The rubber hardness of the obtained test piece was measured in accordance with JIS K6253 using a type A durometer at a temperature of 20° C. The obtained results are shown on the row "Rubber hardness" of Table 7 as index values with the value of Standard Example 3 being expressed as an index of 100. A larger index value indicates larger rubber hardness and superior steering stability of a formed tire.

tan δ at 60° C.

Using a viscoelastic spectrometer, manufactured by Toyo Seiki Seisaku-sho, Ltd., the loss tangent, tan δ, at a temperature of 60° C. of the obtained test piece was measured in accordance with JIS K6394 under conditions at an initial distortion of 10%, an amplitude of ±2%, and a frequency of 20 Hz. The obtained results of tan δ are shown on the "heat build-up resistance" row in Table 7 as index values with the value of Standard Example 3 being expressed as an index value of 100. A smaller index value of the heat build-up resistance indicates smaller heat build-up, thereby suppressing overheating in a tire for a construction vehicle.

Tensile Strength at Break

JIS #3 dumbbell test pieces were produced using the obtained test pieces in accordance with JIS K6251. The tensile test was conducted at a room temperature (20° C.) at a tensile test speed of 500 mm/min, and tensile strength at break was measured. The obtained results are shown on the row "Cut resistance" in Table 7 as index values with the value of Standard Example 3 being expressed as an index value of 100. A larger index value indicates higher tensile strength at break and superior cut resistance.

TABLE 7

| | | Standard Example 3 | Comparative Example 16 | Comparative Example 17 | Comparative Example 18 |
|---|---|---|---|---|---|
| NR | Part by mass | 100 | 100 | 100 | 100 |
| Carbon black | Part by mass | 45 | 45 | 45 | 45 |
| Type of carbon black | | CB-2 | CB-1 | CB-3 | CB-4 |
| $N_2SA$ | m²/g | 86 | 91 | 44 | 74 |
| 24M4 | mL/100 g | 75 | 102 | 82 | 100 |
| ΔDst/Dst | — | — | 0.74 | 0.62 | 0.70 | 0.84 |
| Dst | nm | 100 | 98 | 165 | 148 |
| Satisfying/unsatisfying Formula (1) | | Unsatisfied | Unsatisfied | Unsatisfied | Unsatisfied |
| Rubber hardness | Index value | 100 | 105 | 70 | 94 |
| Heat build-up resistance | Index value | 100 | 108 | 82 | 103 |
| Cut resistance | Index value | 100 | 105 | 68 | 95 |

| | | Comparative Example 19 | Example 10 | Example 11 | Example 12 |
|---|---|---|---|---|---|
| NR | Part by mass | 100 | 100 | 100 | 100 |
| Carbon black | Part by mass | 45 | 45 | 45 | 45 |
| Type of carbon black | | CB-11 | CB-6 | CB-7 | CB-8 |
| $N_2SA$ | m²/g | 113 | 84 | 75 | 52 |
| 24M4 | mL/100 g | 107 | 105 | 111 | 100 |
| ΔDst/Dst | — | 0.93 | 0.81 | 0.73 | 0.80 |
| Dst | nm | 125 | 212 | 187 | 251 |
| Satisfying/unsatisfying Formula (1) | | Satisfied | Satisfied | Satisfied | Satisfied |
| Rubber hardness | Index value | 118 | 115 | 113 | 106 |

TABLE 7-continued

| | | | | | |
|---|---|---|---|---|---|
| Heat build-up resistance | Index value | 110 | 87 | 87 | 86 |
| Cut resistance | Index value | 117 | 113 | 115 | 105 |

TABLE 8

| Common formulation of rubber composition for tire | |
|---|---|
| Stearic acid | 1.5 parts by mass |
| Zinc oxide | 3.0 parts by mass |
| Vulcanization accelerator | 1.5 parts by mass |
| Sulfur | 2.5 parts by mass |

The types of raw materials used in Table 8 are described below.

Stearic acid: beads stearic acid, manufactured by NOF Corporation

Zinc oxide: Zinc Oxide #3, manufactured by Seido Chemical Industry Co., Ltd.

Vulcanization accelerator: Santocure CBS, manufactured by FLEXSYS

Sulfur: Golden Flower oil treated sulfur powder (sulfur content: 95.24 wt. %), manufactured by Tsurumi Chemical Industry Co., Ltd.

As is clear from Table 7, it was confirmed that the rubber compositions for tires for construction vehicles of Examples 10 to 12 maintained or enhanced the rubber hardness, the cut resistance, and the heat build-up resistance comparable to or beyond conventional levels. These rubber compositions are suitable to form undertread portions of tires for construction vehicles.

As is clear from Table 7, the rubber composition of Comparative Example 16 exhibited poor heat build-up resistance since the nitrogen adsorption specific surface area $N_2SA$ of the carbon black CB-1 was greater than 90 $m^2/g$, the compressed DBP absorption (24M4) was less than 95 mL/100 g, and Formula (1) was not satisfied.

The rubber composition of Comparative Example 17 exhibited poor cut resistance since the compressed DBP absorption (24M4) of the carbon black CB-3 was less than 95 mL/100 g, and Formula (1) was not satisfied.

The rubber composition of Comparative Example 18 exhibited poor heat build-up resistance and poor cut resistance since the carbon black CB-4 did not satisfy Formula (1).

The rubber composition of Comparative Example 19 exhibited poor heat build-up resistance since the nitrogen adsorption specific surface area $N_2SA$ of the carbon black CB-11 was greater than 90 $m^2/g$.

The invention claimed is:

1. A rubber composition for a tire, the rubber composition comprising: per 100 parts by mass of diene rubber, from 5 to 120 parts by mass of carbon black having a nitrogen adsorption specific surface area $N_2SA$ of 85 $m^2/g$ or less and a compressed DBP absorption (24M4) of 95 to 120 mL/100 g, a ratio $\Delta Dst/Dst$ of a half width $\Delta Dst$ (nm) of a mode diameter Dst to the mode diameter Dst (nm) in a Stokes diameter mass distribution curve of aggregates of the carbon black being 0.65 or greater, and the $N_2SA$, the (24M4), and the Dst satisfying Formula (1) below:

$$(24M4)/Dst < 0.0093 \times N_2SA - 0.06 \quad (1)$$

wherein Dst is a mode diameter (nm) in Stokes diameter mass distribution curve of aggregates and is 160 nm or greater, $N_2SA$ is a nitrogen adsorption specific surface area ($m^2/g$), and (24M4) is a compressed DBP absorption (mL/100 g).

2. The rubber composition for a tire according to claim 1, wherein the $N_2SA$ is 50 $m^2/g$ or greater.

3. The rubber composition for a tire according to claim 1, wherein the $\Delta Dst$ is from 159 to 202 nm.

4. A pneumatic tire that uses the rubber composition for a tire according to claim 1.

5. A rubber composition for a tire for a construction vehicle, the rubber composition comprising: per 100 parts by mass of diene rubber containing 60 mass % or greater of natural rubber, from 30 to 80 parts by mass of inorganic filler containing carbon black having a nitrogen adsorption specific surface area $N_2SA$ of 85 $m^2/g$ or less and a compressed DBP absorption (24M4) of 95 to 120 mL/100 g, a ratio $\Delta Dst/Dst$ of a half width $\Delta Dst$ (nm) of a mode diameter Dst to the mode diameter Dst (nm) in a Stokes diameter mass distribution curve of aggregates of the carbon black being 0.65 or greater, and the $N_2SA$, the (24M4), and the Dst satisfying Formula (1) below:

$$(24M4)/Dst < 0.0093 \times N_2SA - 0.06 \quad (1)$$

wherein Dst is a mode diameter (nm) in Stokes diameter mass distribution curve of aggregates and is 160 nm or greater, $N_2SA$ is a nitrogen adsorption specific surface area ($m^2/g$), and (24M4) is a compressed DBP absorption (mL/100 g).

6. The rubber composition for a tire for a construction vehicle according to claim 5, wherein the $N_2SA$ is 50 $m^2/g$ or greater.

7. The rubber composition for a tire for a construction vehicle according to claim 6, wherein the inorganic filler further contains from 5 to 25 parts by mass of silica.

8. The rubber composition for a tire for a construction vehicle according to claim 7, wherein greater than 30 parts by mass of the carbon black are compounded.

9. The rubber composition for a tire for a construction vehicle according to claim 5, wherein the inorganic filler further contains from 5 to 25 parts by mass of silica.

10. The rubber composition for a tire for a construction vehicle according to claim 5, wherein greater than 30 parts by mass of the carbon black are compounded.

11. A pneumatic tire for a construction vehicle comprising a tread portion formed using the rubber composition for a tire according to claim 5.

12. A pneumatic tire for a construction vehicle comprising a tread portion formed using the rubber composition for a tire according to claim 8.

* * * * *